United States Patent
Giatilis et al.

(10) Patent No.: US 12,232,009 B2
(45) Date of Patent: Feb. 18, 2025

(54) METHOD FOR INTERACTING WITH A NETWORK DEVICE

(71) Applicant: ATOS Public Safety, LLC, Irving, TX (US)

(72) Inventors: Vasileios Giatilis, Vrilissia (GR); Ioannis Kolaxis, Athens (GR)

(73) Assignee: UNIFY PATENTE GMBH & CO. KG, Munich (DE)

( * ) Notice: Subject to any disclaimer, the term of this patent is extended or adjusted under 35 U.S.C. 154(b) by 343 days.

(21) Appl. No.: 17/941,054

(22) Filed: Sep. 9, 2022

(65) Prior Publication Data
US 2023/0123854 A1  Apr. 20, 2023

(30) Foreign Application Priority Data
Oct. 14, 2021  (EP) ..................................... 21202602

(51) Int. Cl.
*H04W 4/90* (2018.01)
*H04W 4/021* (2018.01)

(52) U.S. Cl.
CPC .............. *H04W 4/90* (2018.02); *H04W 4/021* (2013.01)

(58) Field of Classification Search
CPC ..... H04W 4/90; H04W 4/021; H04W 12/069; H04W 4/80; H04W 84/18; H04M 2250/02; H04M 2250/04; H04M 3/42348; H04M 2242/30; H04M 3/5116
USPC ...................................................... 455/404.1
See application file for complete search history.

(56) References Cited

U.S. PATENT DOCUMENTS

| | | | |
|---|---|---|---|
| 2006/0233317 A1* | 10/2006 | Coster ................. | H04M 7/0075 379/45 |
| 2010/0317317 A1* | 12/2010 | Maier ................... | H04W 4/029 455/404.2 |
| 2014/0140488 A1* | 5/2014 | Meer .................... | H04M 3/5116 379/45 |
| 2015/0111527 A1* | 4/2015 | Michaelis ............. | H04W 24/00 455/404.2 |
| 2015/0327039 A1 | 11/2015 | Jain | |
| 2016/0302050 A1* | 10/2016 | Blando ................. | H04W 4/02 |
| 2018/0184236 A1 | 6/2018 | Faraone et al. | |

FOREIGN PATENT DOCUMENTS

EP            3076689 A1    10/2016

OTHER PUBLICATIONS

European Search Report for European Application No. EP 21 20 2602.5 dated Mar. 30, 2022.

* cited by examiner

*Primary Examiner* — Don N Vo
(74) *Attorney, Agent, or Firm* — MEAGHER EMANUEL LAKS GOLDBERG & LIAO, LLP

(57) ABSTRACT

A method for interacting of a PSAP with a portable network device includes detection of a trigger signal of an eyewitness-button and storing call log data of the call by the PSAP. A signaling connection between the portable network device and the PSAP can be set up and a geographical area of interest close to the actual location of the portable network device can be determined. At least one external portable network device of a list can be scanned and the scanning result from the at least one external portable network device of the list can be forwarded to the PSAP via the signaling connection after it is protected by the PSAP. Systems and devices can utilize embodiments of the method.

14 Claims, 6 Drawing Sheets

METHOD FOR INTERACTING WITH A NETWORK DEVICE

CROSS-REFERENCE TO RELATED APPLICATIONS

The present application claims priority to European Patent Application No. EP 21 202 602.5 filed on Oct. 14, 2021. The entirety of this European Patent application is incorporated by reference herein.

FIELD

The present invention relates to a method for interacting of a public-safety answering point (PSAP) with a portable network device, a communication device, a non-transitory computer-readable medium, a communication system, and a network system.

BACKGROUND

Emergency incidents reported by individuals calling emergency services, e.g. 9-1-1 in the USA or 1-1-2 in Europe, can be distinguished in at least two categories. On the one hand there are callers who report emergency incidents that happen to themselves, for example someone who has been a victim of theft, or someone who has been directly involved in a car accident. On the other hand, there are callers who report incidents that happen to others. Particularly these are eyewitnesses of emergency incidents, who are usually not aware of the identity of the people directly involved in an emergency incident and are thus not able to provide any details that may be required by the emergency services.

Eyewitnesses calling emergency service to report incidents that involve others usually report an incident of an identity being unknown to them. For example, in case of an emergency incident an eyewitness calls emergency services reporting the incident so that emergency responders are dispatched, e.g. medical personnel. This may for example happen when a couple is riding a motorcycle and is involved in a traffic accident. Then both people may be injured and may lie on the street. However, the emergency responders, e.g. medical personnel on the ambulance, do not have any information about the medical records of the injured persons. Thus, the medical team does not know the blood type, any prescribed medication or any other health issue which must be taken into consideration for providing them with the most appropriate medical treatment.

Today, the medical personnel need to wait until they arrive on the emergency scene to start working on identifying the medical records of the injured persons, something that may not even be possible if the injured are unconscious. As a result, precious time may be lost, with this process making it likely for medical errors to occur, potentially leading to irreversible health problems or even death of the patients.

Another kind of emergency could be a crime incident in which criminals such as burglars, bank robbers, shoplifters, etc. are involved. Today, an eyewitness reporting this incident is not aware of the criminals' identities while reporting this to emergency services over the phone; however, it would be useful if a technical methodology could be found for disclosing the criminals' identities to the emergency services.

U.S. Pat. No. 10,594,816 B2 relates to a method and system for capturing, collecting, providing, and sending targeted messages, such as text or multimedia, to individual users or groups of users on a network based on their location and proximity to an incident, concern, or perceived threat.

International Publication No. WO 2016/015097 A1 relates to a system and method for making personal emergency information available to third parties, the method includes the steps of providing a first person with a wireless device which can be interrogated to extract device information from the device; assessing whether a second person who has interrogated the device is authorized to access personal information of the first person; and selectively making the personal information available to the second person based on the result of the assessment.

SUMMARY

An object of the present invention is to provide an efficient emergency solution that can address and improve upon conventional approaches. In some embodiments, a method for interacting of a PSAP system with a portable network device is provided. A PSAP system can include devices and applications for emergency call management. The applications can be hosted by one or more servers and utilized by one or more devices of the system via their communicative connection with the one or more servers, for example. Emergency responder personnel can utilize such devices and telecommunication services. A PSAP can be a device that may be utilized in such a system.

Embodiments of the method can include establishing a call between a portable network device and the PSAP and detecting a trigger signal of an eyewitness-button. Upon detecting the trigger signal, call log data of the call are stored by the PSAP and the PSAP sets up a signaling connection between the portable network device and the PSAP. The method further provides for determining in the PSAP a geographical area of interest which is close to the actual location of the portable network device. With this location information a list of external portable network devices is determined, comprising at least one external portable network device located within the geographical area of interest. In other words, all portable network devices within the region of the geographical area are identified. The location may be determined by using location-based services. The method further provides for scanning the at least one external portable network device of the list.

Since this scanning may access highly private data, the method uses a method of protecting the signaling connection from unauthorized access for forwarding data of an external portable network device. This protection may substantially be handled by the PSAP. Information retrieved from the external portable network device, e.g. the scanning result from the at least one external portable network device of the list, is forwarded via the signaling connection to the PSAP. By scanning, in particular personal data of victims, the emergency services may be informed about important facts such as medical records, critical contact information, residence, etc. of each person involved in an emergency scene. This may prevent losing time when they arrive at the location of an incident.

In an example, emergency responders may have access to the medical records of the injured people before an ambulance is dispatched so that specialized medical personnel and/or equipment can be sent to the emergency scene depending on the existing health issues of the injured people. The proposed approach would enable emergency responders to provide a personalized medical treatment to each patient, thus maximizing the probabilities of successful survival and recovery for each individual patient.

Furthermore, there are numerous cases where in addition to the need of obtaining a victim's identification (ID) it may be important not to touch a victim. While attempting to look for a victim's cellphone or identification papers, the eyewitness may improperly move the victim's body and do harm and/or worsening her/his condition. Especially in a crime scene, an eyewitness could alter or damage useful evidence.

A functionality for the call taker, e.g. an operator of the PSAP, can be provided to assist to perform some actions when the call taker tries to assess the reported incident. It may be possible to log the reporter's phone number, e.g. the phone number of the caller, and in this way already getting an identification of the caller. In addition, it may be possible to determine the location data of the caller who may call from a place that he or she is not familiar with. For retrieving location information, a location-based service may be used such as Automatic Location Identification (ALI). The method may also support tagging the retrieved information and/or tagging the reporter as an "eyewitness" and/or as a third party. Such tagging may be useful in case the witness's information is needed later, e.g. for criminal investigations or a court call.

The method provides a very efficient way for obtaining a victim's or many victims' data in a seamless and fast way. A control mechanism may be implemented for syncing between call takers on common reported incidents.

According to another aspect of the present invention, storing the call log data and setting up the signaling connection between the portable network device and the PSAP is triggered by a signaling protocol message, for example, a SIP (Session Initiation Protocol) message. This action may be initiated by an Activate Remote Data Acquisition Service message (Activate RDAS). Such an Activate RDAS message may be an implementation in the signaling protocol.

According to yet another aspect of the present invention, the method step of the PSAP protecting the signaling connection from unauthorized access for forwarding data of an external portable network device comprises at least one protection mechanism selected from a list of protection mechanisms. The list of protection mechanisms the PSAP can select from, consists of providing a token by the PSAP, switching the portable network device in a transparent relay mode, employing an encryption mechanism, disabling scanning and/or forwarding of data by a signaling message, disabling scanning and/or forwarding of data automatically, and/or unlocking the protection mechanism by using an authentication certification mechanism. Such protection mechanisms may allow for using the signaling connection for transmitting private data from the external portable network device of a victim to the PSAP by using the portable network device of the caller as a transparent relay. In other words, the reporters' or eyewitness' portable network device may be used by an application installed on the portable network device to be remotely operated by the PSAP using the signaling protocol and/or SDP protocol (Session Description Protocol) as signaling protocol and work as a gateway for translating NFC (Near Field Communication) and/or Bluetooth signals into the signaling connection. In this way receiving personal data from the external portable network device via protocol translation is made possible.

According to another aspect of the present invention, at least one external portable network device and/or the plurality external portable network devices which is/are on the list is/are sequentially scanned according to an order of the list. In this way it is ensured that all potential victims are recognized and doublets that may occur by a plurality of reporters reporting the same identical incident can be deleted.

According to another aspect of the present invention, the PSAP uses an Application Service and/or the portable network device uses an application. Implementing the method as a program code for an application may allow for simple distribution of the algorithm to portable devices such as mobile phones and/or smartphones.

According to a further aspect of the present invention, the method comprises providing personal data stored in the external portable network device as a result of scanning the at least one external portable network device of the list comprises.

According to another aspect of the present invention, scanning the at least one external portable network device of the list comprises using a short-range wireless connection technology.

A short-range wireless connection technology may be based on an NFC (Near Field Communication) protocol, a Bluetooth protocol and/or an RFID (Radio-Frequency Identification) protocol in some embodiments.

According to yet another aspect of the present invention, the method comprises determining types of short-range wireless connection technologies implemented in the at least one external portable network device and/or in the portable network device and selecting one of the detected different types of short-range wireless connection technologies.

According to a further aspect of the present invention, the physical transmission range of the short-range wireless connection technology is shorter than the physical transmission range of a wireless connection technology that is used between the portable network device and the PSAP network device or PSAP.

By using a short-range wireless connection technology the number of external portable network devices that may be detected by the caller is limited by the limited distribution area of short-range wireless connection technology. The limit in reach and the area restriction is due to the fact that a short-range wireless connection technology may employ low transmission power and/or the radiation is heavily attenuated.

According to another aspect of the present invention, the geographical area of interest is an area around the portable network device.

According to yet another aspect of the present invention, the method further comprises determining in the PSAP a further geographical area of interest close to an actual location of a further portable network device and determining a list of further external portable network devices comprising at least one further external portable network device located within the further geographical area of interest. The method also comprises comparing the list of external portable network devices with the list of further external portable network devices and finding intersections between the list of external portable network devices and the list of further external portable network devices.

By comparing the reported external network devices with the reported further external network devices an indicator may be generated which provides a measure for the likelihood that a reported incident is related to a further reported incident.

According to another aspect of the present invention, a program element is provided which when being executed by a processor is adapted to carry out the inventive method for interacting of a PSAP with a portable network device.

According to a further aspect of the present invention, a computer-readable medium is provided comprising program code, which when being executed by a processor is adapted to carry out the inventive method for interacting of a PSAP with a portable network device.

A non-transitory computer-readable medium may be a floppy disk, a hard disk, a USB (Universal Serial Bus) storage device, a RAM (Random Access Memory), a ROM (read only memory) or an EPROM (Erasable Programmable Read Only Memory). A computer readable medium may also be a data communication network, e.g. the Internet, which may allow downloading a program code.

In one example, the program code, at least partially, may be provided as an application such as an Application Service for the PSAP and/or an application for the portable network device.

According to yet another aspect of the present invention, a PSAP and/or a portable network device is provided which may form a network system. Thus, the network system comprises a PSAP and a portable network device.

The portable network device is adapted for establishing a call between the portable network device and the PSAP, wherein the PSAP is adapted for detecting a trigger signal of an eyewitness-button. The eyewitness-button may be any virtual and/or physical button that is adapted to generate a trigger signal that can be evaluated by another functional element.

The PSAP is further adapted for storing call log data of the call and for setting up a signaling connection between the portable network device and the PSAP and for determining a geographical area of interest close to the actual location of the portable network device. The PSAP is further adapted for determining a list of external portable network devices. This list comprises at least one external portable network device located within the geographical area of interest determined by the PSAP.

The portable network device is adapted for scanning the at least one external portable network device of the list. If a plurality of portable network devices is in this list the portable network device scans each of the portable network devices in that list.

The PSAP is further adapted for protecting the signaling connection from unauthorized access for forwarding data of an external portable network device.

The portable network device is adapted for forwarding the scanning result from the at least one external portable network device of the list via the signaling connection to the PSAP.

It has to be noted that aspects of the invention have been described with reference to different subject-matters. In particular, some aspects have been described with reference to apparatus type claims whereas other aspects have been described with reference to method type claims. However, a person skilled in the art will gather from the above and the following description that, unless other notified, in addition to any combination between features belonging to one type of subject-matter also any combination between features relating to different types of subject-matters is considered to be disclosed with this text. In particular, combinations between features relating to the apparatus type claims and features relating to the method type claims are considered to be disclosed.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

The illustration in the drawings is schematic and may be not to scale. In different drawings, similar or identical elements are provided with the same reference numerals.

REFERENCE NUMERALS USED IN THE DRAWINGS INCLUDE

S101-S109 steps of a method
200 PSAP database
201 PSAP
201a call taker at PSAP
201b Application Service on PSAP
202 portable network device of reporter
202a' reporter 1
202a" reporter 2
202b application on portable network device
203 external portable network device of victim
203a' victims reported by reporter 1
203a" victims reported by reporter 2
203b application on external portable network device
S201-S210 steps of a method
S301-S311a steps of a method
S406-S411 steps of a method
500 incident
501' radius drawn by first call taker
501" radius drawn by second call taker
502 intersection
S601, S602 steps of a method

DETAILED DESCRIPTION

Figure 1:
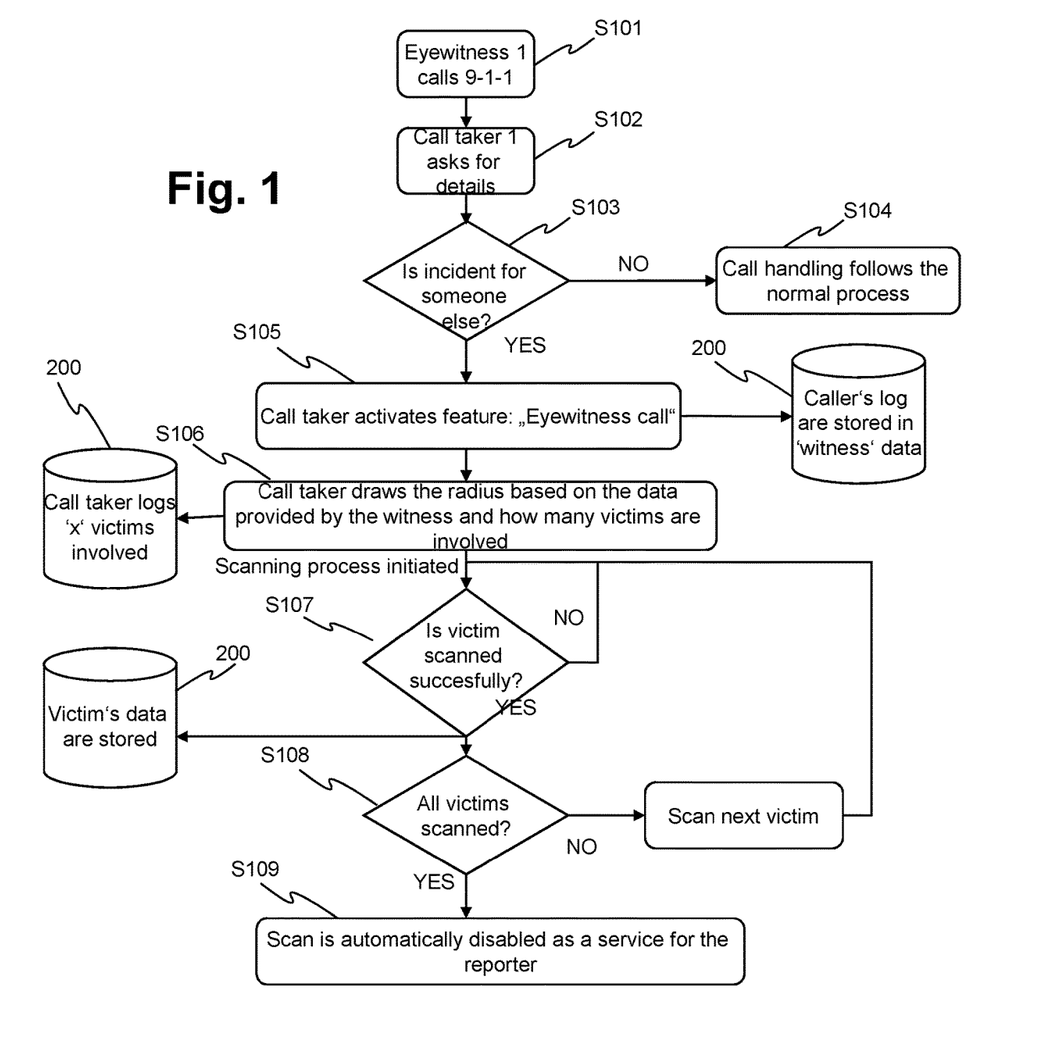
FIG. 1 is a flowchart of a method for interacting of a PSAP with a portable network device according to an exemplary embodiment of the present invention.

FIG. 1 shows a flowchart of a method for interacting of a PSAP with a portable network device according to an exemplary embodiment of the present invention. The PSAP can include a communication device that includes a processor connected to a non-transitory memory and at least one transceiver and also be connectable to or include one or more input devices (e.g. a keyboard, a mouse, a touch screen display), one or more output devices (e.g. a display). A PSAP can include a desktop computer, a laptop computer, a work station, or other type of communication device configured as a PSAP. The portable network device can include a portable communication device that includes a processor connected to a non-transitory memory and at least one transceiver and also be connectable to or include one or more input devices (e.g. a keyboard, a mouse, a touch screen display), one or more output devices (e.g. a display). An example of a portable network device is a smart phone, a tablet, or other type of portable communication device.

The method of FIG. 1 can be executed in a network system comprising a PSAP and a portable network device. In an example, the PSAP is a PSAP according to the National/European Emergency Number Association (NENA/EENA) standard for Next Generation (NG) 9-1-1 or NG 1-1-2 or other NG systems. The portable network device may be any portable device with a wireless network interface such as a smart phone, a handheld device or a mobile phone. The method can empower emergency responders to have access to personal details or personal data of all persons involved in an emergency incident. The personal data such as medical records and/or address data may be stored on a portable network device of the relevant person e.g. a victim). Just for the sake of simplicity, persons and their portable equipment may be used equally in this text. Similar simplification where the description of the person also includes its device may be used when describing an eyewitness and the operator of a PSAP. Accessing the personal information of the device owner via its device may allow to assess those data while an emergency call is still handled by the call-takers who operate in the PSAP. The call may be any audio and/or video call from a device of an eyewitness and may be active before any resources such as an ambulance, fire truck and/or police is dispatched to the scene of the emergency. In an emergency scenario, at least one victim or a plurality of victims is/are involved in an incident. At least one of the victims has a portable network device such as a smart phone with a short-range wireless communication sub module as for example an NFC module or a Bluetooth module. The portable network device of the victim may be referenced as external portable network device in order to indicate that it is located in a certain distance of a reporter who is eyewitness of the incident. The physical range in which the short-range wireless communication may be used may depend on the environment but may be in the range of 0 m to 4 cm, 0 m to 1 m, 0 m to 10 m and/or 0 m to 100 m. In a distance larger than the maximum coverage area, a physical signal strength may be under a detectable threshold. Such a maximum coverage area may be defined by the underlying standard of the relevant technology. In the emergency scenario there is at least the reporter, witness or eyewitness who observes or hears the incident and who has a portable network device such as a smart phone device and/or a cell phone or a mobile phone. A call taker is an operator of the PSAP and is handling emergency calls. In particular, the call taker accepts emergency calls over a sophisticated NG (Next Generation) network. The portable network devices may run at least a part of the method as an application or as an innate smartphone OS (Operating System) background application that is harnessed by the call taker to perform the emergency call and data processing. As an option, the call taker may operate an Application Service which is executed on the PSAP. In an example, the Application Service acts as a server under PSAP's authority. A specific functionality may be activated via a button provided as a physical button on an operation panel and/or as a virtual button in the respective application. The method described in FIG. 1 helps to obtain personal data under PSAP's supervision over data exchange-oriented communication protocols. FIG. 1 shows the principal flow which ensures a safe and protected transmission of the personal data of the victim. The method supports emergency personnel with fast and complete incident reporting. The method may be described on the basis of the signaling protocol and SDP protocol. However, this should not be seen as a restriction and the method may be used in combination with any appropriate underpinned communication protocol. In step S101 a victim and/or patient has an accident or a sudden health issue that makes her/him impossible to make a call on her/his own. A first eyewitness, referenced as eyewitness 1 or witness 1, observes the incident and calls as a reporter immediately the next generation emergency service. The reporter uses his portable network device for establishing his call. In step S102, the first call taker, referenced as call taker 1, receives the call and questions the circumstances of the incident. In step S103, the witness 1 indicates that the incident is not her/his own, but someone else's incident and he/she is only the eyewitness. Thus, the call taker 1 in step S103 generates a trigger signal by activating a button "Reporting witness" and/or an eyewitness-button which is provided by the PSAP. This trigger signal is detected by the PSAP and prevents the method to follow a call procedure without involving scanning of short-range connections as indicated in step S104. After the decision to use the short-range scanning function, in step S105, the PSAP stores call log data of the call in a PSAP database 200. In an example, the call log data may be provided in a signaling message and may comprise an application ID, a telephone number of eyewitness 1, location data of eyewitness 1 and/or address data of eyewitness 1. This storing operation may comprise logging of necessary information in a separate field which is oriented purely with the witness's details. The PSAP also establishes a signaling connection between the portable network device of the witness and the PSAP that will enable the secure transmission of patient's information. At the same time of enabling the secure transmission of patient's information, the portable network device is switched into an operation mode that allows for scanning other devices, e.g. by using the short-range wireless connection. In step S106, the call taker finds out by questioning the witness 1 about the estimation of the distance in which the at least one victim lies. In case of many victims, the question will be the perimeter and/or radius that the victims lie within. In this way the call taker can substantially determine the geographical area of interest close to the actual location of the portable network device of the first witness 1. In an example, the call taker may determine the geographical area of interest by processing the location data which have been received from witness 1 and which may be stored in the database 200 and by drawing a circle on a map around the location of witness 1. This circle has a radius which corresponds to the estimation of the perimeter of the area with victims. For instance, a circle is drawn on the map stored on the PSAP. The PSAP has stored a location of all external portable network devices in the area close to the location of the reporter's portable network device. The external portable network devices are all detected except the portable network device of the reporter. Then all external portable network devices are identified which are located within the circle and are enabled for being scanned by the reporter's portable network device. In other words, a test is made to verify which of the portable network devices has a short-range wireless connection technology implemented and activated, e.g. NFC or Bluetooth. Further, the portable network devices are instructed to allow the transmission of sensitive information of the owner of each network device, such as personal data, while the given emergency call is in progress. The number of available external portable network devices is stored in the PSAP database 200 as well as the number of victims affected by the incident. Then in step S107, for every external portable network device which has been identified as to belong to a victim a scan is made by using a corresponding short-range wireless connection and the corresponding personal data gathered from scanning via the short-range wireless connection is transmitted via the secure signaling connection to the PSAP and stored in the PSAP database 200. After it is recognized that all the detected external portable network devices have been scanned, in step 108, the operation mode that allows the portable network device for scanning other devices is automatically disabled by the PSAP. Thus, the reporter cannot scan anymore, and, in this way, it is prevented that the portable network device can have unauthorized access to personal information of external portable network devices nearby. It can be disabled forcedly by the call taker or automatically when all victims are successfully scanned, and personal details have been obtained by PSAP. Automatically disabling the signaling connection and/or the scanning mode may be one of a plurality of other protection mechanism used to protect the privacy of the transmitted data and of the data on the external portable network device. During the transfer of the personal data the portable network device works as a transparent gateway between the signaling connection and the short-range wireless connection, e.g. between SIP and NFC or Bluetooth. The transmission is substantially controlled by the PSAP which is authorized to have access to the personal and private data and the portable network device of the reporter is used as a local relay, which transparently forwards the personal data. In this way, restrictions made by data protection law may be met. The method finishes in step 109 after scanning has automatically been disabled as a service for the reporter.

Figure 2:
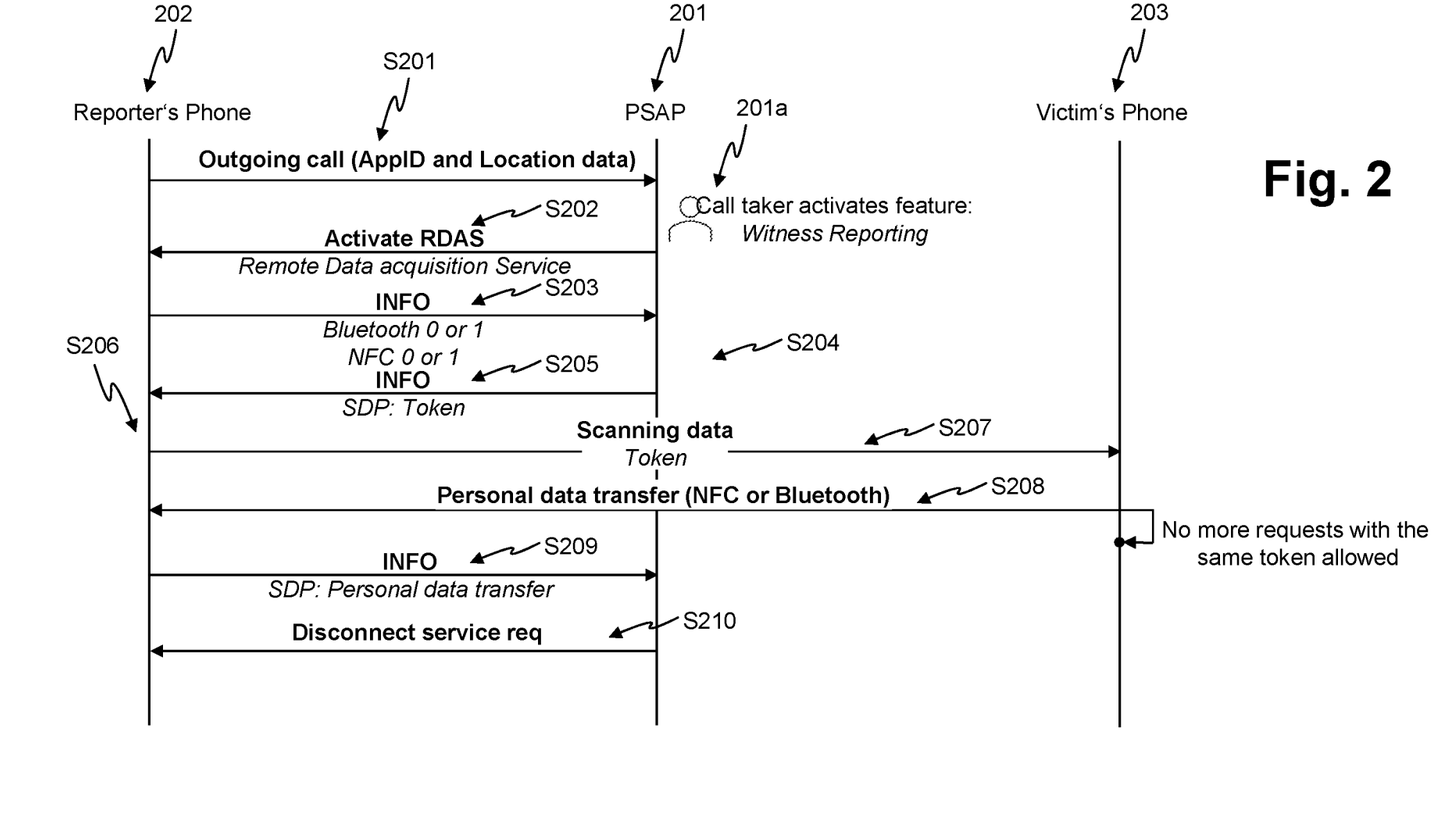
FIG. 2 shows a specific message flow chart for a transfer of personal data of a victim's external portable network device to a PSAP via a portable network device of the reporter according to an exemplary embodiment of the present invention.

FIG. 2 shows a specific message flow chart for a transfer of personal data of a victim's external portable network device 203 to a PSAP 201 via a portable network device 202 of the reporter according to an exemplary embodiment of the present invention. The portable network device 202 of the reporter is used as a scanning device and as a mediator and/or relay device for forwarding scanned data to the PSAP 201. FIG. 2 shows the details how victim's personal data are transported over a signaling channel and/or a signaling connection. The NFC technology is a short-range wireless transmission technology for obtaining data within a range of 4 cm. In case there is a victim, and that victim has an NFC enabled external portable network device 202, e.g a smartphone, it is possible for the reporter who has as well an NFC enabled portable network device to scan the NFC signal in the victim's smartphone and to obtain data without touching the victim. These data can be stored in the external portable network device 202 or as an alternative in a tag on victim's vesture or a tag in a wallet, etc. Another short-range wireless technology for transmitting information can be Bluetooth which may be implemented on a portable network device. Bluetooth may be made available in a Bluetooth module which can be integrated in a mobile phone or as a standalone module. When enabling a service over Bluetooth it may be indicated to act in fact as beacon service. When the Bluetooth beacon service is enabled, it is possible to receive requests for transmitting data by scanning nearby devices. However, in both short-range transmission technologies, e.g.

NFC and Bluetooth, transmitted data are not protected by any security measures and malicious users may exploit this vulnerability. For that reason, the inventive method implements a secure process that can only be activated provided that the reporter is indeed reporting an incident for a third party. In addition, the service should also be disabled as soon as the relevant information has been transmitted. In other words, the inventive method provides temporarily access for the portable network device 202 of the reporter to read out and transmit highly confidential private data of a third-party device, wherein the reception of the data is controlled by the PSAP 201. The PSAP 201 may act as the gate keeper for accessing the external portable network device 203. As NFC or Bluetooth technologies cannot be used out-of-the-shelf without user interaction, in order to enable the service, the method provides for a mechanism to enable the short-range wireless connection, in particular for the victim's device. In order to use the short-range wireless connection, both receiver and transmitter need to be enabled before the desired functionality can be used. However, often the relevant short-range wireless technology is enabled and for the simplicity of the description it is assumed that the portable network device of the reporter and the external portable network device of the victim have at least one technology activated. With regard to NFC as a short-range wireless connection technology it is to be noted that data can be exchanged between the transmitter and the receiver within a maximum distance of 4 cm. This means that the reporter is required to bring his/her portable network device in close proximity to the external portable network device of the victim in order to retrieve the data. If both short-range wireless technologies are available, the PSAP 201 may instruct the network device 202 to prefer NFC over Bluetooth. The shorter range of reach of the NFC signal may reduce the risk of false negative signals, e.g. receiving a different signal from another victim than the victim in close proximity of the reporter. As shown in FIG. 2 in step S201, the portable network device 202, e.g. a phone, sets up a call with the PSAP 201. As soon as the call taker 201a realizes that the reporter reports an incident as witness, the call taker 201a activates the scanning service on the portable network device 202 of the reporter by sending a signaling protocol message, like but not limited to a Session Initiation Protocol message (SIP). For example, a SIP message, "Activate RDAS" (Remote Data Acquisition Service) wherein the signaling protocol message "Activate RDAS" is adapted to switch on a scanning mode on the portable network device 202 is send. The signaling protocol message "Activate RDAS" is transparently sent to the portable network device 202 in step S202 and triggers in the background a mechanism to obtain remote data via the short-range wireless connection. Switching on the scanning mode on portable network device 202 also provides for responding to the PSAP 201 in a signaling protocol INFO message information about the short-range wireless technology which is implemented on the actual portable network device 202 which has established the call. This INFO message comprises flags which indicate the respective available and/or enabled short-range wireless technology by Boolean values true or false as indicated in step S203. In the example of FIG. 2, it is assumed that in step S204 call taker 201a is informed that the reporters' portable network device 202 has NFC available and enabled. Thus, the call taker 201a instructs the portable network device to switch into the scanning mode and instructs the reporter to scan victim's body closely using NFC. Such instruction may be transmitted from the PSAP to the portable network device in a signaling protocol INFO message comprising an SDP packet with a token as shown in step S205. In an example, the instruction for scanning is indicated to the reporter by a message on the display of the portable network device and/or another optical or acoustical signal. The scanning mode is enabled in step S206. In order to start scanning the external portable network device 203 of the victim the portable network device 202 of the reporter sends in step S207 the token provided by the PSAP over a short-range connection to the external wireless portable network device 203. It is to be noted that the communication between the PSAP 201 and the portable network device 202 is based on a signaling protocol and/or SDP communication on the network layer, but the communication between portable network device 202 and external portable network device 203 is an NFC short-range wireless connection purely based on a physical layer. The token is used to authorize the short-range wireless connection for the portable network device 202, however, the private data is transparently transmitted from the PSAP 201a to the external portable network device 203. In step S208 the transmission of personal data via the short-range wireless connection takes place. Data that is received by the portable network device 202 is immediately forwarded to the PSAP 201 at the other end of the signaling channel or signaling connection. The data is transmitted without being interpreted by the portable network device 202. In other words, the portable network device 202 just makes a transparent protocol conversion of the received data in order to forward the received data to the PSAP 201. The transmission of the personal data is shown in step S209. The scanning mode on the portable network device 202 will be disabled after receiving a disconnect message from the PSAP 201 which indicates call taker's confirmation of terminating the connection. As an alternative to disabling the scanning mode by a confirmation message, an automatic shutdown of the scanning mode may be possible, e.g. after the expiration of a timer. After disabling the scanning mode, no further scan access will be possible for that specific external portable network device 203. Only external network devices which have not yet been scanned can be accessed by the portable network device 202. In order to differentiate the different external portable network devices, individual tokens are used. After the scanning mode is disabled for a specific external portable network device by the PSAP 201, no more requests with the same token are allowed. An external portable network device 203 of a victim may permanently be in a listen mode for a short-range wireless connection but is only able to send data after a token from a third-party NFC client is received such as a portable network device 202. Receiving this token indicates to the external portable network device 203 that the PSAP 203 has authorized the transmission of personal information and ensures that the reporter's device 202 will not keep any data since it acts as a mediator or a relay between victim and PSAP. An additional encryption mechanism that uses the provided token may increase the security. In this way transmission of personal data between external portable network device 203 and PSAP 201 may be encrypted and the risk of the portable network device accessing the personal data may be reduced. After data has been received by the portable network device 202, the portable network device 202 itself transmits these data over the established signaling channel or the signaling connection between the reporter 202 and PSAP 201. The PSAP agencies can unlock this feature (authorized transmission of personal information) over authentication certification mechanisms, e.g. X.509 certificates. It should be appreciated that the term "PSAP agencies" can refer to all the organizations (including the call-takers working for these organizations) whose task is to answer emergency calls. As a summary, the method comprises different steps. A call is established between the portable network device 202 and the PSAP 201 in step S201 and a trigger signal of an eyewitness-button is detected. If this signal is detected call log data of the call is stored by the PSAP 201 and the PSAP 201 sets up a signaling connection between the portable network device 202 and the PSAP 201. The PSAP 201 determines a geographical area of interest close to the actual location of the portable network device 202 and determines a list of external portable network devices 203 wherein the list comprises at least one external portable network device 203 located within the geographical area of interest. The PSAP 201 requests the portable network device 202 to scan the at least one external portable network device 203 of the list and receive personal data from the external network device 203 as scanning result. In order to prevent unauthorized access to the scan result, the PSAP 201 is adapted to protect the signaling connection from unauthorized access for forwarding data of the external portable network device 203. Eventually the portable network device 202 forwards the scanning result, e.g. the confident personal data, from each of the at least one external portable network device 203 on the list via the signaling connection to the PSAP 201. A proliferation of techniques for exchanging data via portable network devices or cell phones exist. A plurality of these techniques has been designed for use in emergency situations. In the example of Bluetooth pairing is accomplished by the users explicitly requesting access to one another. In another example when using NFC for exchanging data, the connection and the traffic of data is being underpinned by an application which supports NFC. Apart from exchanging generic data, there are methods that describe the exchange of emergency data over NFC which supports specific functions. In these cases, the existence of a tag which carries relevant information, e.g. location data, help a specific terminal obtaining them and transmitting them via phone device to the NG operator. The tag however is an all-accessible NFC transmitter which can be accessed by any device and offers non-sensitive data. In general, the short-range wireless connection technology providing the smaller coverage area is preferred over the short-range wireless technology providing the larger coverage area. A technology with a longer range may also include non-victim devices when scanning a victim's device. In other words, the longer range may lead to an overlap of signals and may end up with scanning the wrong device. However, if NFC is unavailable in step S203, S204 Bluetooth may be used as a fallback solution. The principles and message exchange between the three entities 201, 202, 203 as shown in FIG. 2 are also applicable when Bluetooth is selected in step S204. However, the scanning steps S207 and S208 further comprise iterating, by the portable network device of the reporter 202, through all available signals of victim's devices 203 until the strongest signal is established. This refers to the Bluetooth protocol. Contrary to NFC that operates within a range of ~4 centimeters, Bluetooth operates in a range of ~10 meters. Clearly, when using Bluetooth, the "Portable Network Device of Reporter" (202) may intercept not only the victim's device (assuming the reporter stands close to the victim's body) but may intercept additional devices located nearby. Here, it is referred to using the already established Bluetooth techniques to identify the strongest signal, implying that this will correspond to the victim's device (as it is the one being in the smallest distance from the reporter's device). After the external portable network device 203 having the strongest signal strength is identified, it is possible to transfer the data in a one-time-shot, on a single data package and/or as a bulk of data as described in step S208 in FIG. 2 for the case of employing NFC. There may be another case where the larger coverage area of Bluetooth is preferable over the smaller coverage area of NFC. In step S106 of FIG. 1 when determining the geographical area of interest, the call taker 201a may in addition ask the reporter whether the reporter can reach the victim or not. Should the victim be involved in a car accident and be locked in the vehicle, it may be impossible for the reporter to get close enough to the victim in order to use NFC as a short-range wireless connection with its short-range of approximately 4 cm. In such a case call taker 201a may change the preference of short-range wireless connection and may decide that under the present circumstances the short-range wireless connection having the longer range may be preferred. In an example, the call taker 201a may decide that the Bluetooth technology is preferred over the NFC technology even if both technologies are available on the portable network device 202. In other words, the selection of the short-range wireless technology may depend on the actual situation. In an example the PSAP 201 may comprise a further button in the application's control panel which would be only available if the feature is enabled. Here it is referred to the case that the caller has clarified she/he is just an eyewitness who wishes to report (report) an incident, with the call-taker activating the button "Reporting witness". Only then should this additional button/option be displayed to explicitly choose Bluetooth over NFC.

Figure 3:
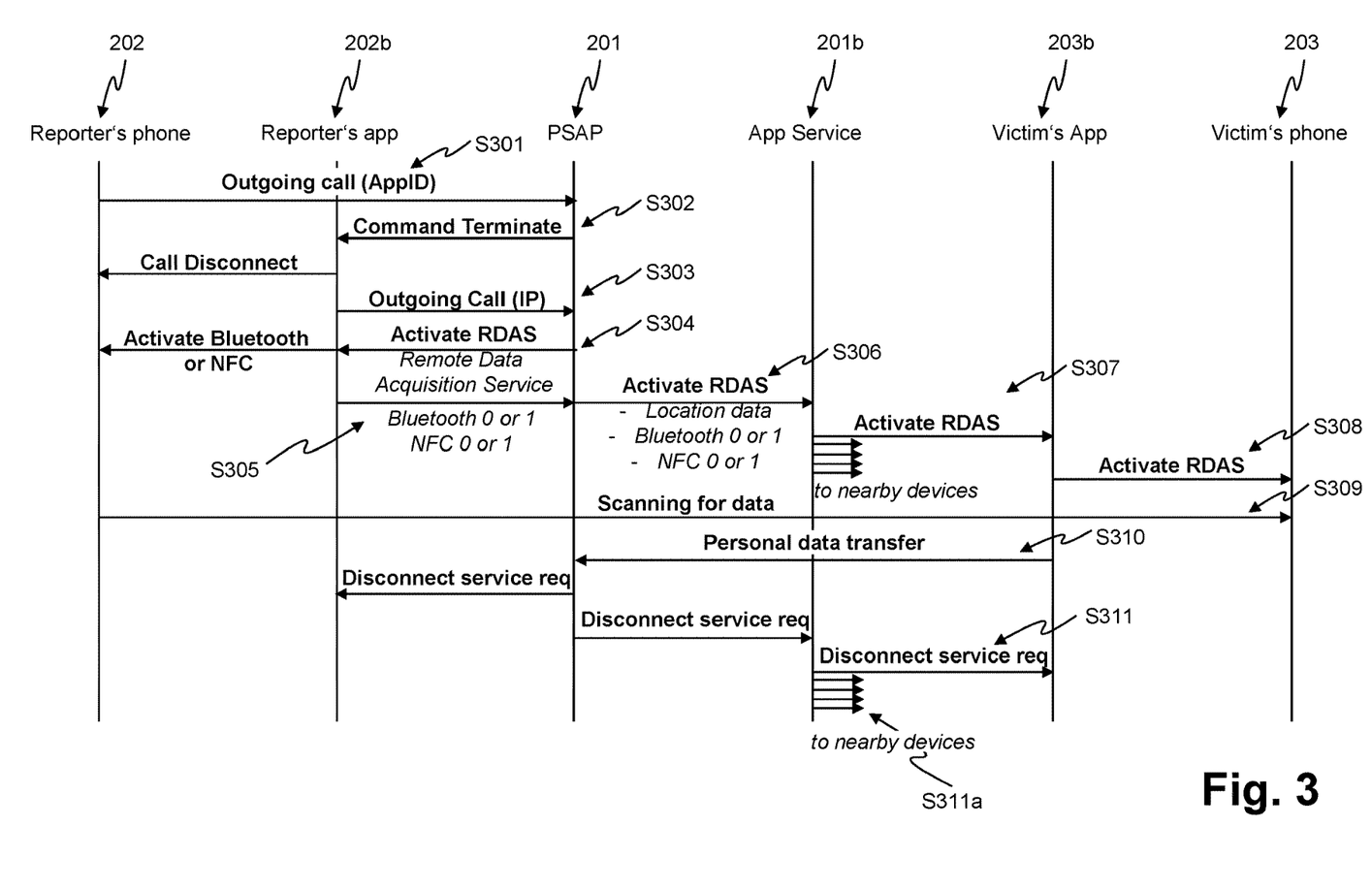
FIG. 3 shows a message flow chart for a transfer of personal data of a victim's external portable network device to a PSAP via a portable network device of a reporter where applications are used on the devices according to an exemplary embodiment of the present invention.

FIG. 3 shows a message flow chart for a transfer of personal data of a victim's external portable network device 203 to a PSAP 201 via a portable network device 202 of the reporter where applications are used on the devices 201, 202, 203 according to an exemplary embodiment of the present invention. FIG. 3 substantially corresponds to FIG. 2, however, shows in addition the additional communication for interacting with a respective application of the devices. As an example, all apps 201b, 202b, 203b implement the RDAS (Remote Data Acquisition Service) related functionality. Mobile apps 202b (Reporter's app) and 203b (Victim's app) will most likely be the same mobile application, installed by all the civilians on their mobile/smart phones specifically for the case of emergencies. Despite the fact that 202b and 203b may refer to the same mobile application, a distinction is made in this diagram to illustrate how they operate in a different mode, depending on the role of their user (Reporter vs Victim). On the contrary, 201b (PSAP App Service) may be a software application running on the PSAP (On-premises, on a data-center or on the public cloud) that helps orchestrate the interactions between the different applications. For different reasons, e.g. power saving and/or for security reasons, some users may do not have Bluetooth or NFC activated on their devices. Therefore, a medium is needed under which both the reporter's 202 and the victim's portable network devices 203 can communicate and exchange data without requiring any user action for such an activation. If NFC and/or Bluetooth is disabled, a special application may be used to communicate with the PSAP 201 and for controlling the short-range wireless connection. The application 201b, 202b, 203b may be active on the portable network device and may be reached via a signaling connection or a push technology implemented by the Operating System (OS) of the portable network device 202, 203. In an example, an emergency application, e.g. a health inspection app, that is installed on the respective device may be extended in order to support the scanning of other devices. The functional extension may extend an application in order to serve as a mediator or relay for establishing a supervised communication between victim and reporter. As already described, smartphones may substantially by default prevent to answer when being scanned by other devices, terminals or endpoints. For this reason, there is a set of standards under the Pan-European Mobile Emergency App (PEMEA) standard for Europe that enables the inter-working of emergency mobile applications and underpin relevant features. An application that complies with the PEMEA standards can make NFC or Bluetooth accessible via the app for emergency requests. The enablement for both technologies can also be dependent on the functionality of such application. For example, the application could support detecting the falling on the floor for its owner and upon that incident to enable these features automatically. The mobile app 201b, 202b, 203b can perform several actions, including but not limited to enabling and/or disabling on demand a Bluetooth beacon service, enabling and/or disabling on demand NFC, obtaining information from the NFC and/or Bluetooth protocol handlers, sending and receiving information to and from the reporter, sending and receiving information to and from the victim and/or encrypting the personal data information. As shown in the message flow diagram of FIG. 3, the application 202b and the application service 201b act as a mediator and/or as a relay between the two entities for enabling the service when disabled. When the reporter calls the emergency service in step S301, it can send a unique application ID, e.g. an AppID, over a signaling connection of SDP. In this example, the reporter uses a mobile call based on the GSM (Global System for Mobile Communications) standard. If a TDM (Time Division Multiplexing) call is used, the relevant parameters such as AppID (Applicaton identifier) are sent via an Signaling System 7 (SS7) Information Element. The SS7 (Signaling system 7) is an out-of-band signaling system used to provide basic routing information, call set-up and other call termination functions. Signaling is removed from the voice channel itself and put on a separate data network. Also known as CCS7 (Common Channel Signaling No. 7). The AppID characterizes the current user, e.g. the reporter or the victim. After receiving the AppID of the reporter, the identification and/or identity of the reporter is now known in the PSAP 201 and the call taker at the PSAP side can optionally terminate the GSM call and the TDM call respectively with the user and switch the call seamlessly to an IP call between the reporter and PSAP as shown in the steps S302 and S303. Then, since the application is active, the PSAP agent 201a or PSAP call taker 201a is able to send a command for enabling NFC or Bluetooth or other possible means for remote data acquisition via any other short-range wireless protocol or radio frequency (RF) protocol. This may be made by using the Activate RDAS message as shown in step S304. The PSAP 201 receives a receipt confirmation about enabling the short-range wireless connection in step S305. Upon receiving this receipt confirmation in the PSAP 201 the PSAP 201 forwards the information about which short-range wireless service was enabled to the PSAP's App Service 201b inside an Active RDAS message as shown in step S306. Since App Service 201b and PSAP 201 lie on the same side, e.g. in an operation center, it is easy for the App Service 201b to arrange a narrow perimeter around the reporter's end. As an alternative the PSAP call taker 201a can draw a perimeter in the map in which the victim potentially lies based on feedback provided by the reporter. This perimeter is the geographical area of interest where potential victims may be found. Within this perimeter all external network devices 203 or smart phones 203 running the app 203b will get notified by a background message as shown in step S307. The notification message is an Activate RDAS message. The Activate RDAS Message activates eventually the corresponding short-range wireless service depended on its availability, readiness to be used and usefulness with regard to the range in relation to the location of the victims. In an example, in this step a decision is made whether Bluetooth or NFC can be used for the scanning mode of the portable network device 202. Eventually, victim's service will be activated in step S308 and thus it will be enabled to send personal data information when reporter scans the device as shown in step S309. When activation is granted on the victim's side, the reporter is informed either by oral confirmation or by a corresponding signaling message, in order to start scanning the victim's body for a signal. It is assumed that exactly one single victim is reported by the reporter. When any signal is detected, personal data is immediately transferred as indicated in step S310. This transfer of personal data indicates to the App Service 201b that the actual victim was indeed found and the App Service 201b will send a disconnect RDAS request to other smart phones 203 or external network devices 203 that are not included in the incident as shown in step S311 and particularly indicated by the plurality of messages of step S311a. If a plurality of victims is included in the vicinity, e.g. in a scenario where a bomb has exploded or a massacre has occurred, then it is necessary for the PSAP's call taker 201a to have this information in order to assist the reporter and for scanning all possible victims. In such case, there are two possible options. The reporter is aware of how many victims exist in the scene or she/he is unsure. If the caller knows the number of victims, the call taker 201a assigns an upper limit of scans. When this number is reached, scans are automatically disabled and thus, saving call taker's administration effort. In the latter, the call taker 201a needs to take care of when to stop permitting the reporter to scan victims, e.g. by reporter's oral confirmation. This technique supports the call taker 201a to act efficiently on the incident and elaborate the case as data comes in incrementally. In a case with a plurality of victims, the message flow will be adapted as shown in FIG. 4.

Figure 4:
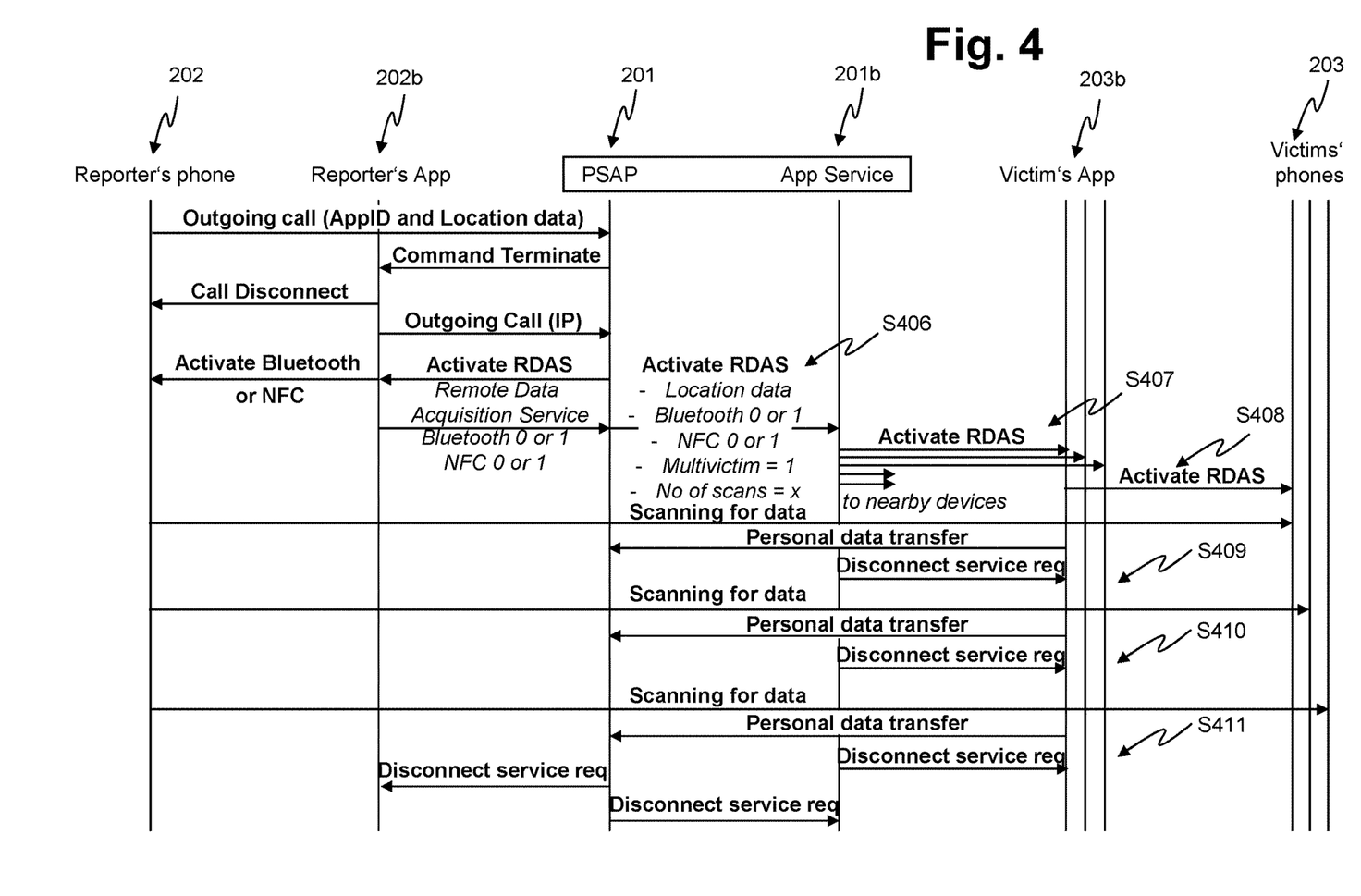
FIG. 4 shows the message flow chart of FIG. 3 for a scenario with multiple victims according to an exemplary embodiment of the present invention.

FIG. 4 shows the message flow chart of FIG. 3 for a scenario with multiple victims according to an exemplary embodiment of the present invention. The message flows are substantially identical with the message flows of FIG. 3. From step S406 the multi victim scenario has an impact to the messages exchanged between the different devices 202, 201, 203. The Activate RDAS message, for example, comprises additional location data, a multi victim flag indicating that a plurality of victims is available and a field indicating the number of scans. The App service 201b distributes this Activate RDAS message to every victim app of the corresponding victims as shown in step S407 and to the relevant external network device as shown in steps S408. After the PSAP 201 and/or the corresponding App Service 201b has scanned all external network devices 203 which have been identified as victim devices 203, the PSAP 201 and/or the App Service 201b release the service as shown in steps S409, S410, S411. When the call is terminated, and the incident management case cycle has finished, the App service 201b releases all pending service request so that all users get released. Additionally, timers should be applied in case of hanging pending service requests which should lie at terminals as well as on side of the App Service. By releasing the pending service requests by command and/or automatically, the privacy for the personal data may be protected from further accesses.

Figure 5:
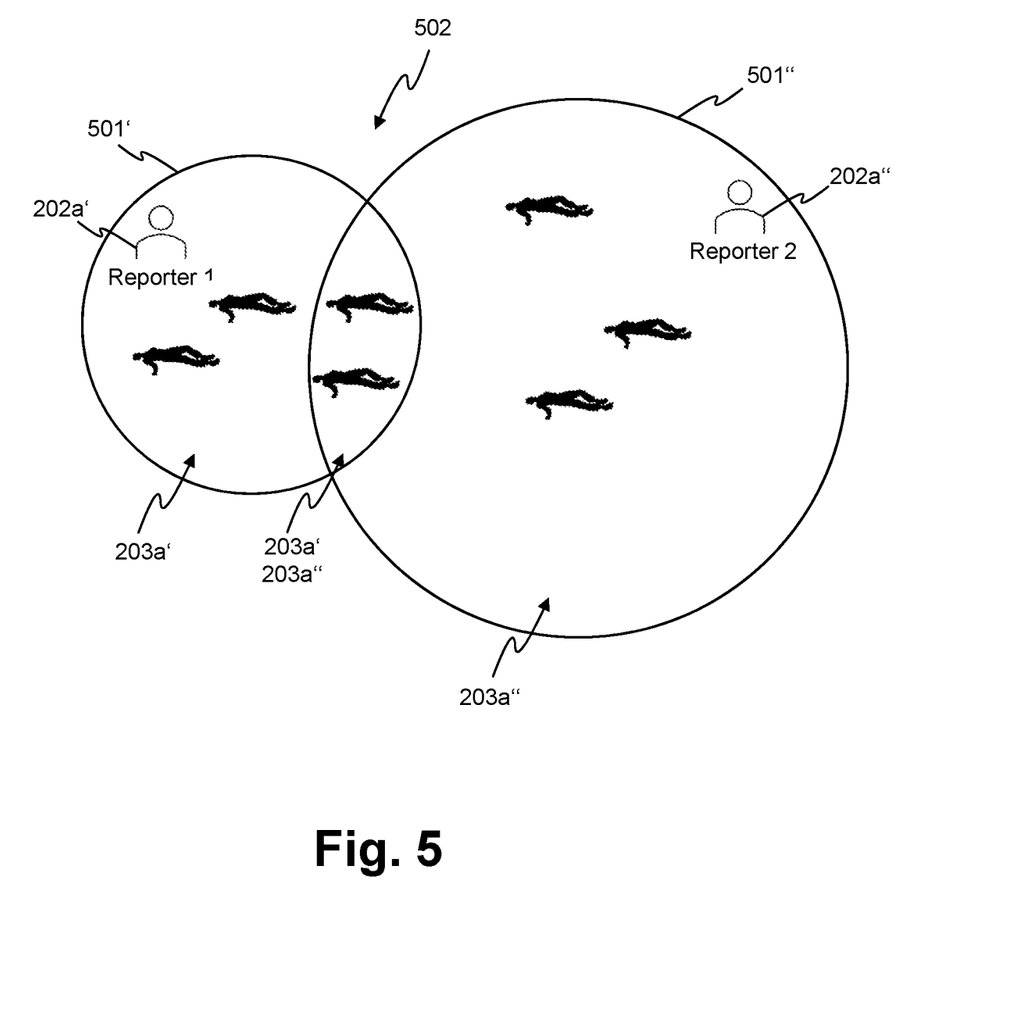
FIG. 5 shows an incident scenario where many reporters call the PSAP in order to report the same incident scenario according to an exemplary embodiment of the present invention.
Figure 6:
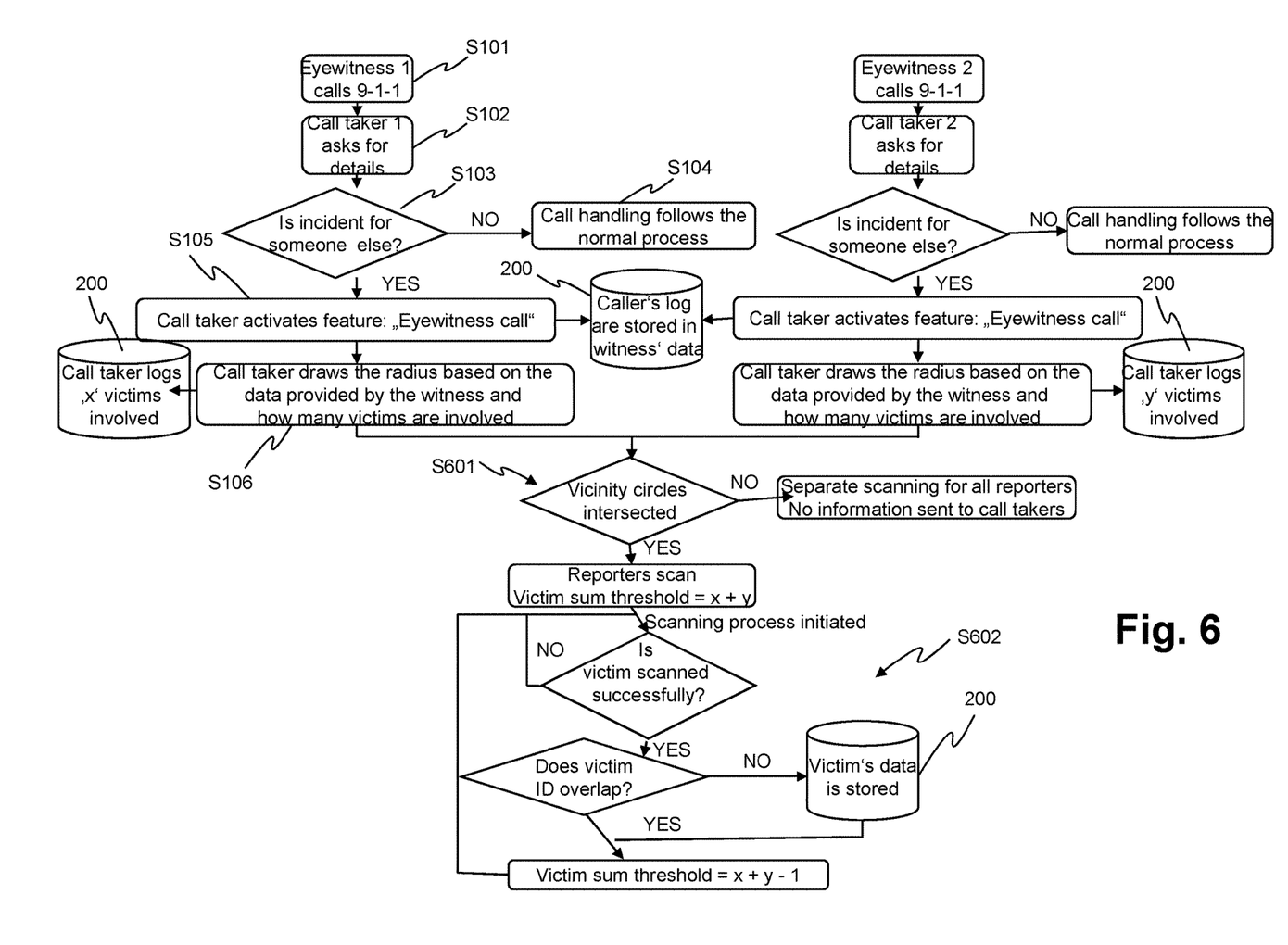
FIG. 6 shows the flowchart of a method for interacting of a PSAP with a portable network device of FIG. 1 for multiple reporters according to an exemplary embodiment of the present invention.

FIG. 5 shows an incident scenario where many reporters 202a', 202a" call in order to report the same incident scenario according to an exemplary embodiment of the present invention. In this scenario, two reporters 202a', 202a" report the same incident 500. Each of the call takers (not shown in FIG. 5) draw a radius 501', 501" and the system detects that the two circles intersect at intersection 502. Even if the method in FIG. 5 is shown with two reporters the method can be used for a plurality of reporters reporting the same incident. The number of call takers accepting the calls correspond to the number of reporters 202a', 202a" and so does the number of radius 501', 501". A first reporter 202a' reports an incident and a call taker activates the scanning feature on the corresponding portable network device 202 and/or on a corresponding application and draws a circle with a radius 501', 501" where the reporter's location is used as the center of the circle. The scanning feature refers to the call-taker activating the button "Reporting witness", which will trigger the "Activate RDAS"-action, as illustrated. The circle indicates the geographical area of interest where victims potentially lie within. A second reporter 202a" reports the same incident 500 and a second call taker performs the same actions of activating the scanning feature and generates a circle as geographical area of interest and so forth. When there is a minimum intersection 502 of these circles, then the system will signal all call takers that potentially this is the same incident. An indication of an intersection 502 may be that at least one victim 303a', 303a" is found within the circle drawn by reporter 1 and by reporter 2. In such case the PSAP administrator can decide whether to assign all reporters 202a', 202a" to one call taker so she/he can control and monitor all reporters at the same time or assign more call takers. Whatever the decision is, the message flow as shown in FIG. 6 will be the same for all cases:

FIG. 6 shows the flowchart of a method for interacting of a PSAP with a portable network device of FIG. 1 for multiple reporters 202a', 202a" according to an exemplary embodiment of the present invention. The message flow of FIG. 6 shows that for every reporter substantially the same steps of the method are executed that are described in FIG. 1. Whenever there is a second reporter 202a" or a further reporter, a check is made in step S601 whether the different circles and/or geographical areas of interest intersect with another. If step S601 recognizes that at least two reporters 202a', 202a" report the same incident 500 and there is a cross section 502 or intersection 502 of the vicinity circles drawn by the call takers, there exists a mechanism as shown in step S602 which monitors the maximum number of successful scans so that scanning can be automatically deactivated for both call takers when the maximum number of scans has been reached. As an example, FIG. 5 shows 7 victims 203a', 203a". However, because the victims in the intersection 502 are counted by both call takers it is obvious that when entering the mechanism at step S502 the maximum number of victims 203a', 203a" is 9. After scanning is completed, the number of victims is reduced to the actual number of 7, as step S602 reduces victims with overlapping victim IDs without putting them into the database 200. In this way the number of actual victims is reduced to the actual number of 7 as the double counted victims are reduced without putting them into the database 200.

It should be noted that the term "comprising" does not exclude other elements or steps and the "a" or "an" does not exclude a plurality. Also, elements described in association with different embodiments may be combined.

It should also be noted that reference signs in the claims shall not be construed as limiting the scope of the claims.

It should also be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for interacting of a Public Service Answering Point (PSAP) with a portable network device comprising:
    establishing a call between the portable network device and the PSAP;
    detecting a trigger signal of an eyewitness-button;
    storing call log data of the call by the PSAP;
    setting up by the PSAP a signaling connection between the portable network device and the PSAP;
    determining in the PSAP a geographical area of interest close to the actual location of the portable network device;
    determining a list of external portable network devices comprising at least one external portable network device located within the geographical area of interest;
    scanning the at least one external portable network device of the list;
    protecting by the PSAP the signaling connection from unauthorized access for forwarding data of an external portable network device;
    forwarding the scanning result from the at least one external portable network device of the list via the signaling connection to the PSAP.

2. The method of claim 1, wherein the storing of the call log data and setting up the signaling connection between the portable network device and the PSAP is triggered by a signaling protocol message.

3. The method of claim 2, wherein the protecting by the PSAP the signaling connection from unauthorized access for forwarding data of the external portable network device comprises at least one protection mechanism selected from the list of protection mechanisms consisting of:
    providing a token by the PSAP;
    switching the portable network device in a transparent relay mode;
    employing an encryption mechanism;
    disabling scanning and/or forwarding of data by a signaling message;
    disabling scanning and/or forwarding of data automatically; and/or
    unlocking the protection mechanism by using an authentication certification mechanism.

4. The method of claim 1, wherein the at least one external portable network device of the list is sequentially scanned according to an order of the list.

5. The method of one of claim 1, wherein the PSAP uses an Application Service; and/or wherein the portable network device uses an Application.

6. The method of one of claim 1, wherein a result of scanning the at least one external portable network device of the list comprises personal data stored in the external portable network device.

7. The method of one of claim 1, wherein the scanning the at least one external portable network device of the list comprises using a short range wireless connection technology.

8. The method of claim 7 further comprising:
    determining types of short range wireless connection technologies implemented in the at least one external portable network device and/or in the portable network device;
    selecting one of the detected different types of short range wireless connection technologies.

9. The method of claim 8, wherein the short range wireless connection technology is selected from Bluetooth, RFID and NFC.

10. The method of claim 7, wherein a physical transmission range of the short range wireless connection technology is shorter than a physical transmission range of a wireless connection technology that is used between the portable network device and the PSAP network device.

11. The method of claim 1, wherein the geographical area of interest is an area around the portable network device.

12. The method of claim 1, further comprising:
    determining in the PSAP a further geographical area of interest close to an actual location of a further portable network device;
    determining a list of further external portable network devices comprising at least one further external portable network device located within the further geographical area of interest;
    comparing the list of external portable network devices with the list of further external portable network devices; and
    finding intersections between the list of external portable network devices and the list of further external portable network devices.

13. A non-transitory computer readable medium having a program stored thereon, that defines a method performed by a device running the program, the method comprising:
    detecting a trigger signal of an eyewitness-button;
    storing call log data of the call by a Public Service Answering Point (PSAP);
    setting up by the PSAP a signaling connection between a portable network device and the PSAP;
    determining in the PSAP a geographical area of interest close to the actual location of the portable network device;
    determining a list of external portable network devices comprising at least one external portable network device located within the geographical area of interest;
    protecting by the PSAP the signaling connection from unauthorized access for forwarding data of an external portable network device so a scanning result from the at least one external portable network device of the list is forwardable via the signaling connection to the PSAP.

14. A network system, comprising:
    a Public Service Answering Point (PSAP);
    a portable network device communicatively connectable to the PSAP;

wherein the portable network device is configured to establish a call between the portable network device and the PSAP;
wherein the PSAP is configured to detect a trigger signal of an eyewitness-button;
wherein the PSAP is configured to store call log data of the call; and for setting up a signaling connection between the portable network device and the PSAP;
wherein the PSAP is configured to determine a geographical area of interest close to the actual location of the portable network device and determine a list of external portable network devices comprising at least one external portable network device located within the geographical area of interest;
wherein the portable network device is configured to scan the at least one external portable network device of the list;
wherein the PSAP is configured to protect the signaling connection from unauthorized access for forwarding data of an external portable network device;
wherein the portable network device is configured to forward the scanning result from the at least one external portable network device of the list via the signaling connection to the PSAP.

* * * * *